United States Patent [19]

Hamada

[11] Patent Number: 4,511,966
[45] Date of Patent: Apr. 16, 1985

[54] DIGITAL SIGNAL PROCESSING SYSTEM

[75] Inventor: Osamu Hamada, Yokohama, Japan

[73] Assignee: Sony Corporation, Tokyo, Japan

[21] Appl. No.: 462,049

[22] Filed: Jan. 28, 1983

[30] Foreign Application Priority Data

Feb. 19, 1982 [JP] Japan ................................. 57-25616

[51] Int. Cl.³ ........................................... G06F 15/16
[52] U.S. Cl. .................................................. 364/200
[58] Field of Search ... 364/200 MS File, 900 MS File

[56] References Cited

U.S. PATENT DOCUMENTS 4,205,372  5/1980  Gruner ................................. 364/200

Primary Examiner—Raulfe B. Zache

Attorney, Agent, or Firm—Lewis H. Eslinger; Alvin Sinderbrand

[57] ABSTRACT

Described is a digital signal processor including at least two memories, that is, a microprogram memory for storing a series of microinstructions for instructing a digital signal processing procedure, and a coefficient memory for storing coefficient data required for performing a series of arithmetic operations on the digital signal data. These data being transferred and written into said microprogram memory and said coefficient memory from a host computer system. The coefficient memory has at least two pages corresponding to the total memory area which may be addressed during digital signal processing to be effected by said microinstructions. Page selection of the coefficient memory may be performed from said host computer system.

3 Claims, 16 Drawing Figures

FIG.4

| MODE | | RS1 | RS0 | $b_7$ | $b_6$ | $b_5$ | $b_4$ | $b_3$ | $b_2$ | $b_1$ | $b_0$ |
|---|---|---|---|---|---|---|---|---|---|---|---|
| $M_0$ | DATA | 0 | 0 | $d_7$ | $d_6$ | $d_5$ | $d_4$ | $d_3$ | $d_2$ | $d_1$ | $d_0$ |
| $M_1$ | UPPER ADDRESS | 0 | 1 | x | x | x | x | $a_{11}$ | $a_{10}$ | $a_9$ | $a_8$ |
| $M_2$ | LOWER ADDRESS | 1 | 0 | $a_7$ | $a_6$ | $a_5$ | $a_4$ | $a_3$ | $a_2$ | $a_1$ | $a_0$ |
| $M_3$ | CONTROL | 1 | 1 | PAGE | $\overline{RST}$ | $\overline{HALT}$ | $\overline{STEP}$ | | | FI | FO |

DIGITAL SIGNAL PROCESSING SYSTEM

BACKGROUND OF THE INVENTION

1. Field of the Invention

This invention relates to a digital signal processing system adapted for realtime processing of digital signals having a larger number of bits per word and a higher word rate per unit time, such as PCM audio signals. More particularly, it relates to such digital signal processing system conveniently applied to a graphic equalizer or echo room with a digital signal delay feature.

2. Description of the Prior Art

In recent years, audio or picture signals are converted into digital signals which then undergo a variety of digital processing or computing operations such as processing by digital filters, fast Fourrier transformation (FFT) or corelative function computing on the realtime basis. Hence, a variety of digital signal processors, hereafter abbreviated sometimes to DSP, have been proposed for performing such realtime processing operations. These DSP's are usually provided with higher precision arithmetic logic units (ALU's), multipliers or other hardware units and controlled by microprograms. In many cases, such digital signal processing is controlled or managed by a host computer system making use of a microprocessor.

These DSP's are provided with internal memories, that is, a microprogram memory and a coefficient memory. The signal processing operation in the DSP's is usually performed in such a manner that microinstructions stored in the microprogram memory are read out sequentially by addresses designated by sequencers or program counters.

System versatility is increased by using random access memories (RAM's) as the aforementioned microprogram memory and coefficient memory, and the data to be entered into these memories may be transferred through control from said host computer system.

In general, realtime processing of the digital signals converted from analog audio or picture signals necessitates fast arithmetic operations such as addition and multiplication, signal delaying and the like processing operations. It has been customary to use a multistage shift registers as hardware or circuitry for causing a delay in the digital signals. In this case, the delay time is expressed as a product of the number of the shift register stages and the sampling period or interval, that is, the period of shift clock pulses.

However, the digital signal delay circuit designed for realtime processing and making use of these shift registers is not subservient to changing the delay time as desired during realtime processing because of the necessity to change the number of the shift registers. In addition, echo rooms or machines formed by a plurality of signal delay lines or circuits tend to be complicated in hardware structure. Above all, with the delay circuits making use of the shift registers, it is practically impossible to effect a dynamic change of the delay time in the respective delay lines. In addition, using a number of shift registers is not economical.

In the conventional DSP's, rewriting the coefficient data, microinstructions etc. during microprogram execution is a desideratum in order to increase the efficiency in realtime processing. However, this is not practically feasible because of oscillations caused by the data becoming discrete especially in the course of rewriting of the coefficient data.

In addition, when the digital signal data is multiplied in the DSP by a coefficient data supplied from the coefficient memory, insufficient word length of the coefficient data may detract from targeted precision of the product especially as a function of the characteristics of digital filters provided in the DSP. On the other hand, multiplier circuits may be extremely complex when the bit numbers of the multiplier and multiplicand are increased to 20 or larger.

OBJECTS AND SUMMARY OF THE INVENTION

It is therefore an object of the present invention to provide a novel digital signal processing system devoid of these inconveniences.

It is a further object of the present invention to provide a digital signal processing system in which plural signal delay circuits can be realized with a simple hardware design.

It is a further object of the present invention to provide a digital signal processing system in which the number and delay time of the delay circuits can be set through programming as desired.

It is a further object of the present invention to provide a digital signal processing system in which the data stored in the coefficient memory or microprogram memory can be changed from the host computer system during execution of the microprogram in the DSP.

It is a further object of the present invention to provide a digital signal processing system in which discrete coefficient data is not produced.

It is a further object of the present invention to provide a digital signal processing system in which oscillations or other undesirable effects may be prevented from occurring.

It is a further object of the present invention to provide a digital signal processing system which enables the coefficient data to be updated during digital signal processing.

It is a further object of the present invention to provide a digital signal processing system with an improved efficiency in the multiplication of the digital signal data by the coefficient data.

It is still another object of the present invention to provide a digital signal processing system which is provided with a smaller size multiplier and in which relatively fast high precision multiplication can be performed without unduly prolonging the processing time even in cases where multiplication has to be performed with a long word length or high precision coefficient data.

In view of the foregoing objects, the present invention resides in a digital signal processing system comprizing at least a microprogram memory storing a series of microinstructions for instructing a digital signal processing procedure, and a coefficient memory storing coefficient data required for performing an arithmetic operation on the digital signal data, wherein data may be transferred and written into said microprogram memory and said coefficient memory from a host computer system, said coefficient memory has at least two pages corresponding to the total memory area addressible through said microinstructions during processing of the digital signal by said microinstructions, and page selection may be performed through control from said host computer system.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure.

BRIEF DESCRIPTION OF THE DRAWINGS

FIG. 4 shows the data transfer modes from the host computer system and the contents of data bits.

DESCRIPTION OF THE PREFERRED EMBODIMENTS

Reference is made to the accompanying drawings showing certain preferred embodiments of the present invention.

Figure 1:
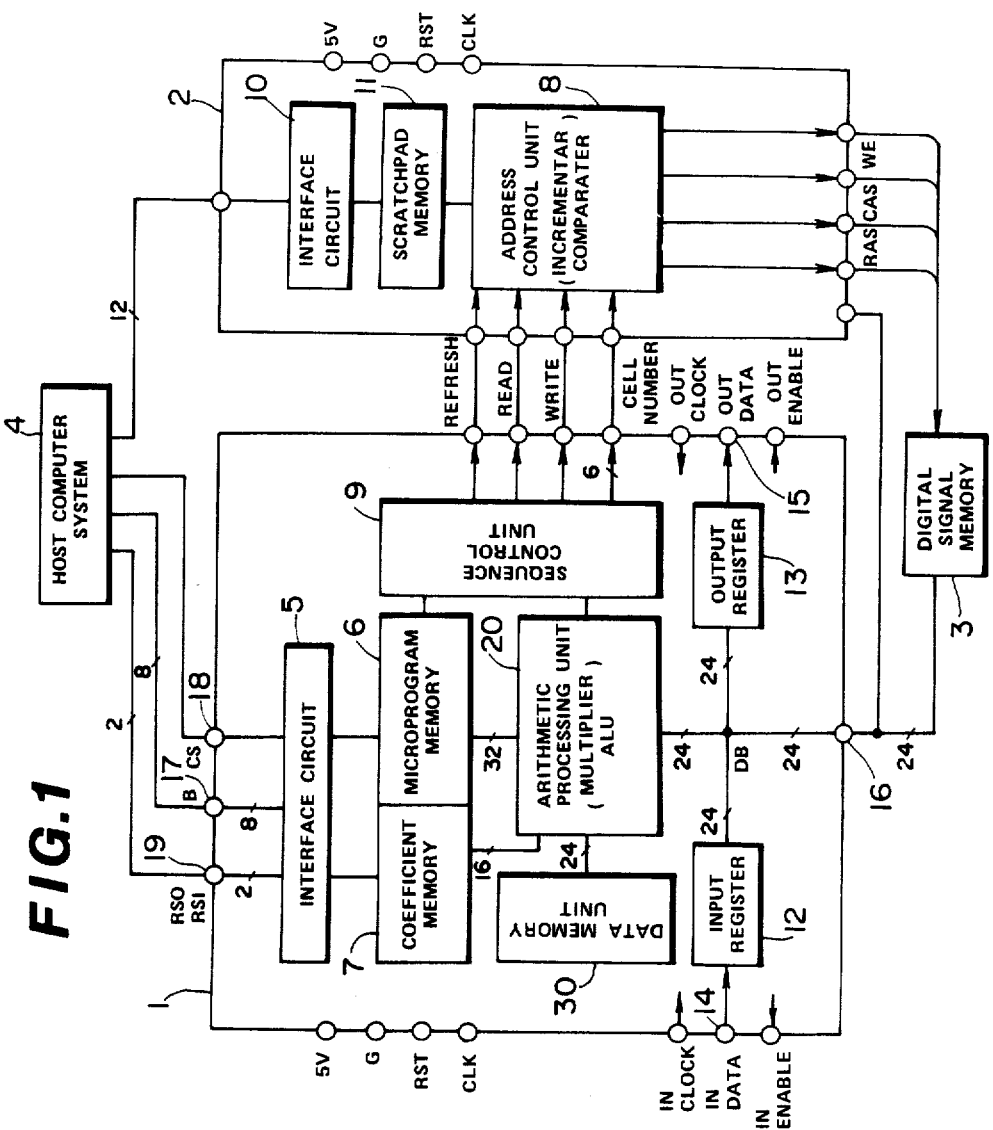
FIG. 1 is a block diagram showing a basic system configuration making use of the digital signal processor (DSP).

FIG. 1 is a block diagram showing an embodiment of a basic system structure making use of a digital signal processor (hereinafter abbreviated to DSP). In the present embodiment, at least certain portions of the DSP 1 and a memory control unit 2 (hereafter abbreviated to MCU), both of which are electronic elements or components, are designed as LSI's. A digital signal memory 3 has a storage capacity of e.g. 16K words (16,384 words) or 64K words (65,536 words) of the digital signals with each word consisting of 24 bits. A D-RAM (dynamic-random access memory) for example is used as such digital signal memory. A host computer system 4 includes a microprocessor designed for managing and controlling the digital signal processing to be executed by the DSP 1 and MCU 2. In the present embodiment, writing can be made from the host computer system 4 into a microprogram memory 6 and a coefficient memory 7 through an interface circuit 5 in the DSP 1.

An address control unit 8 is provided in the MCU 2 for addressing to respective words stored in the digital signal memory 3. The address control unit 8 includes an incrementer, comparator etc. and is controlled by various control signals supplied from a sequence control unit 9 of the DSP 1. Other components of the MCU 2 include an interface circuit 10 for transmitting and receiving signals to and from the host computer system 4, and a scratchpad memory 11.

The digital signals to be processed by the system shown in FIG. 1 may for example be PCM audio signals or digital video signals etc. and the analog signals are quantized so that each sampled value of the analog signal corresponds to one word of the digital signal composed of e.g. 14 or 16 bits. It should be noted that the system making use of such DSP 1 is constructed for processing 24-bit per word digital signals in consideration of increase in the number of bits and the resulting overflow to be caused by multiplication of the 14- or 16-bit per word digital signals by coefficient data.

Figure 2:
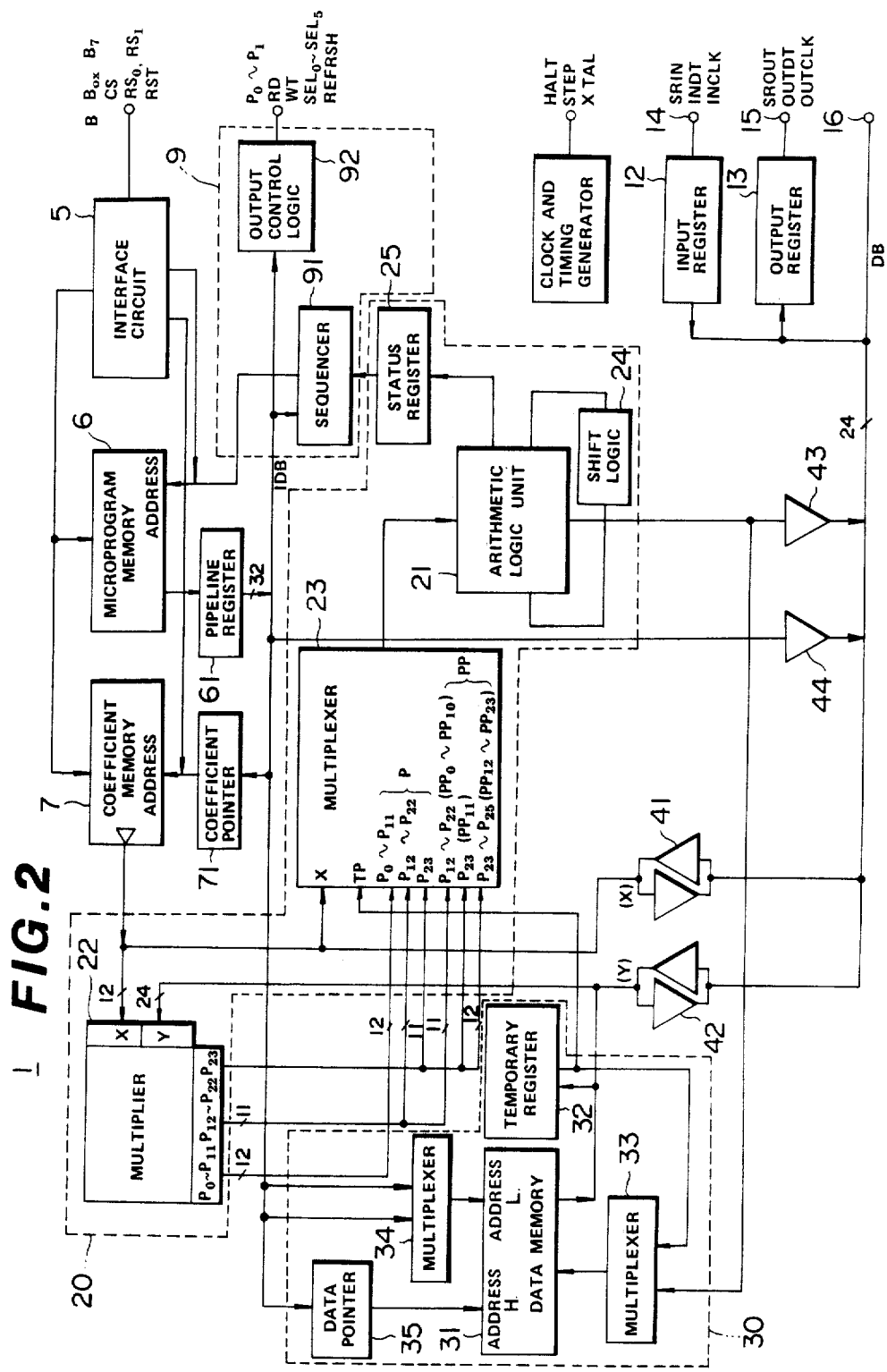
FIG. 2 is a block diagram diagrammatically showing the inside structure of the DSP.

FIG. 2 shows a more detailed circuit structure of the DSP 1 in a block form. In FIGS. 1 and 2, a 24-bit data bus DB is provided in the DSP 1. This data bus DB is connected to an arithmetic processing unit 20, an input register 12, an output register 13 and a digital signal input/output port 16. The input register 12 operates to convert serial data from a data input terminal 14 into a parallel 24-bit data and to output the resulting data to the data bus DB. The output register 13 operates to convert the parallel 24-bit data from the data bus DB into serial data and output the resulting data from a data output terminal 15. The arithmetic processing unit 20 includes at least an arithmetic logic unit (ALU) 21 and a multiplier 22, and a multiplexer 23 is operatively connected to the ALU 21 and the multiplier 22. A data memory 31 and a temporary register 32 are provided as so-called scratchpad memory in a data memory unit 30 in which intermediate data generated in the course of data processing in the arithmetic processing unit 20 are temporarily stored. The data memory 31 has the capacity of e.g. 256 words with each word consisting of 24 bits. The coefficient memory 7 designed for storage of coefficient data as multiplier consisting of one 12-bit word has a capacity of 2 pages each consisting of 512 16-bit words (16 bits × 1024 words). Access may be had to each word in this coefficient memory 7 by address information from the coefficient pointer 72. The coefficient memory 7 has its output terminal connected to terminals of the multiplier 22 and the multiplexer 23 for introducing coefficient data X thereto and to the 24-bit data bus DB through a bi-directional buffer gate 41. The data bus DB is also connected through a bi-directional buffer gate 42 to a terminal of the multiplier 22 for introducing multiplicand data Y. In addition, the data bus is connected to an output terminal of the data memory 30 and to an input terminal of a temporary register 32. In addition to the input terminal for the coefficient data X, the multiplexer 23 has an input terminal for output data TP from the temporary register 32, an input terminal for a product data P from the multiplier 22, and an input terminal for a data PP which is obtained by logical 12-bit shift (or arithmetic 11-bit shift) towards right or lower side of the product data P. The output from the multiplexer 23 is transmitted to ALU 21 operatively associated with a bit shifting logic 24. A status register 25 stores the contents of a flag that may be changed with the arithmetic processing carried out in the ALU 21. The 24-bit digital data resulting from the arithmetic operation is supplied to data bus DB through a buffer gate 43 and to data memory 31 through multiplexer 33. The output data TP from the temporary register 32 is supplied to the other input terminal of the multiplexer 32.

The microprogram memory 6 stores a microprogram for instructing a processing sequence at the respective circuits in the DSP 1. A series of microinstructions that make up microprogram are read out sequentially by address signals supplied from a sequencer 91. These microinstructions have a word length e.g. of 32 bits and are supplied through a pipeline register 61 to an instruction data bus IDB. It should be noted that the 32 bits of the microinstruction word are divided into several fields such as one for immediate data, one for controlling the data memory 31, one for controlling the ALU 21 and one for controlling the sequencer 91. The immediate data contained in the microinstructions are supplied through buffer gate 44 to the data bus 44 while the control data for the data memory 31 are supplied through multiplexer 34 to a lower address input port of the data memory 31. In the sequencer 91, the address in the microprogram memory 6 to be read out next time is determined by sequencer control data contained in the microinstructions and status data from the status register 25 such as flag status. An output control logic 92 is intended for controlling the MCU 2 and is controlled by the microinstructions, with the control logic 92 and the sequencer 91 making up the sequence control unit 9 (FIG. 1). In the microinstructions, there are also contained bits for incrementing a data pointer 35 designating the upper address of the data memory 30 and incrementing the coefficient pointer 71.

The data B from the host computer system in an eight bit per word format can be written into the microprogram memory 6 and the coefficient memory 7 through the interface circuit 5.

Figure 3:
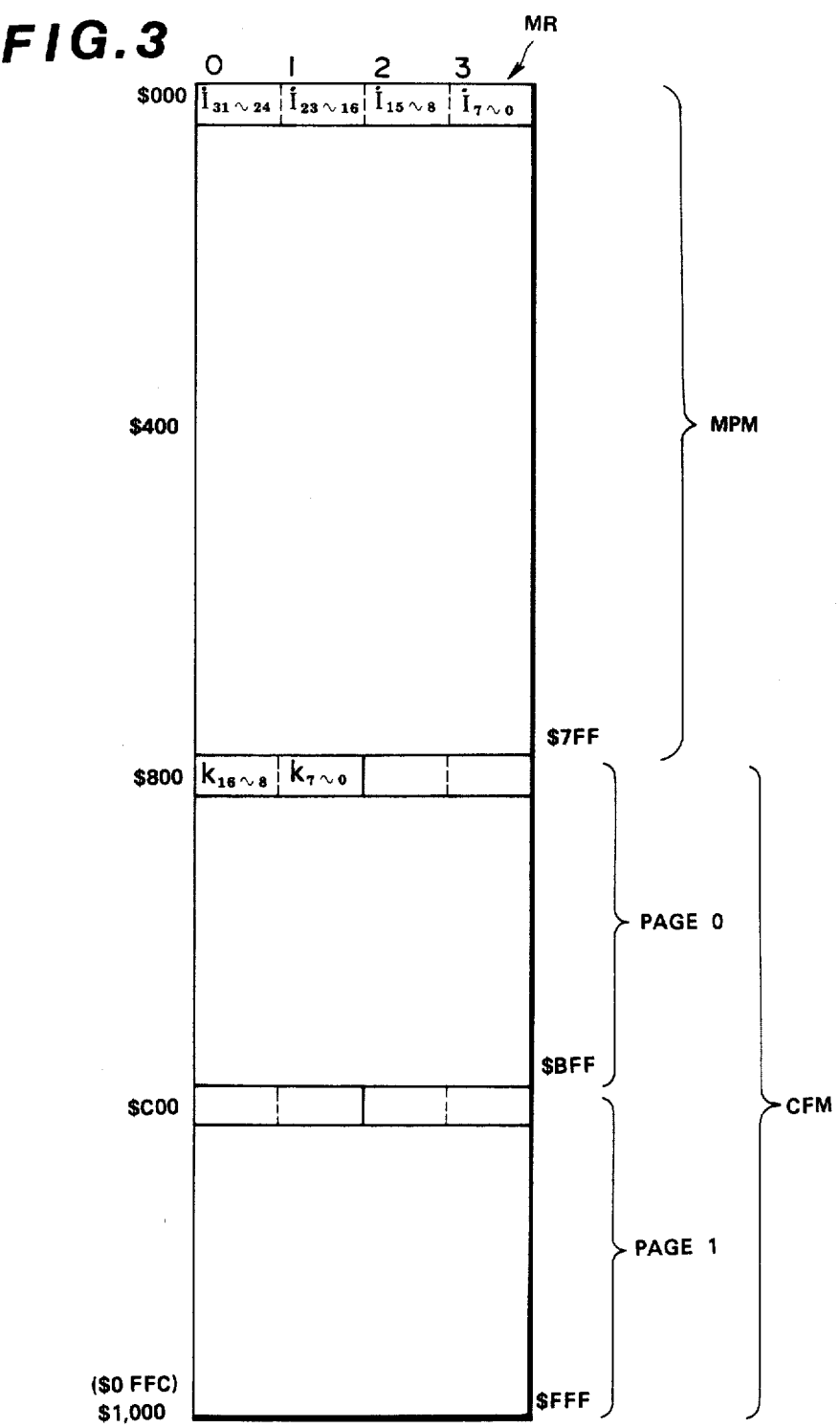
FIG. 3 shows a memory map of the microprogram memory and the coefficient memory.

FIG. 3 shows a memory map for the microprogram memory 6 and the coefficient memory 7 as viewed from the host computer system 4. As seen from FIG. 3, the memories 6, 7 may be viewed from the host computer as a memory MR with a total capacity of 4096 (or $2^{12}$) words, with each word consisting of eight bits (one byte). Access may be made to the memory MR byte per byte with a 12-bit address A. This memory MR is divided into two equal portions each consisting of 2048 bytes. One of the portions with addresses $000 to $7FF in the hexadecimal code is an area MPM for microprogram memory 6, while the remaining portion with addresses from $800 to $FFF is an area CFM for coefficient memory 7. The 2048 bytes of the coefficient memory area CFM are divided further into two equal portions. One such portion for addresses $800 to $BFF is page 0 while the remaining portion for addresses $C00 to $FFF is page 1. In this manner, access may be had from the host computer to the 4096 bytes from $000 to $FFF byte per byte by addressing with the 12-bit address A. In the DSP 1, the program memory area MPM may be addressed by the sequencer 91 for simultaneously reading out the 32-bit microinstruction data I, while the coefficient memory area CFM may be addressed by a coefficient pointer 71 for simultaneously reading out 16-bit coefficient data K. When the address A is designated as $a_0, \cdots a_{11}$, nine bits $a_2 \cdots a_{10}$ are used as an address from the sequencer 91 for having access to the 512 32-bit words, whereas nine bits $a_1 \cdots a_9$ are used as an address from coefficient pointer 71 for having access to the 512 words of the page 1. One bit $a_0$ is used for page switching.

The 8-bit signals from the host computer system 4 are transmitted to the DSP 1 as four different type signals by 2-bit mode-switching signals RS 0, RS 1. FIG. 4 shows the contents of the 8-bit signals for the four modes. The mode switching signals RS 0, RS 1 stand for four different states 00 through to 11, namely data mode M0, an upper address mode $M_1$, a lower address mode $M_2$ and a control mode $M_3$. As may be seen from FIG. 4, with data mode $M_0$, the bits $b_0$ through $b_7$ of the 8-bit data B from the host computer system 4 are the respective bits $d_0$ through $d_7$ of the 8-bit data D practically written into the areas MPM and CFM. With the upper address mode $M_1$, the bits $b_0$ through $b_3$ are the upper four address bits $a_8$ to $a_{11}$ of the 12-bit address for having access to the memory MR. With the lower address mode $M_2$, the bits $b_0$ through $b_7$ are the address bits $a_0$ through $a_7$ of the lower 8-bit address. With the control mode $M_3$, the respective bits $b_0$ through $b_7$ of the upper 8-bit data B are used as respective control signals. For example, the bit $b_7$ is used as page switching control signal PAGE for the coefficient memory area CFM.

Figure 5:
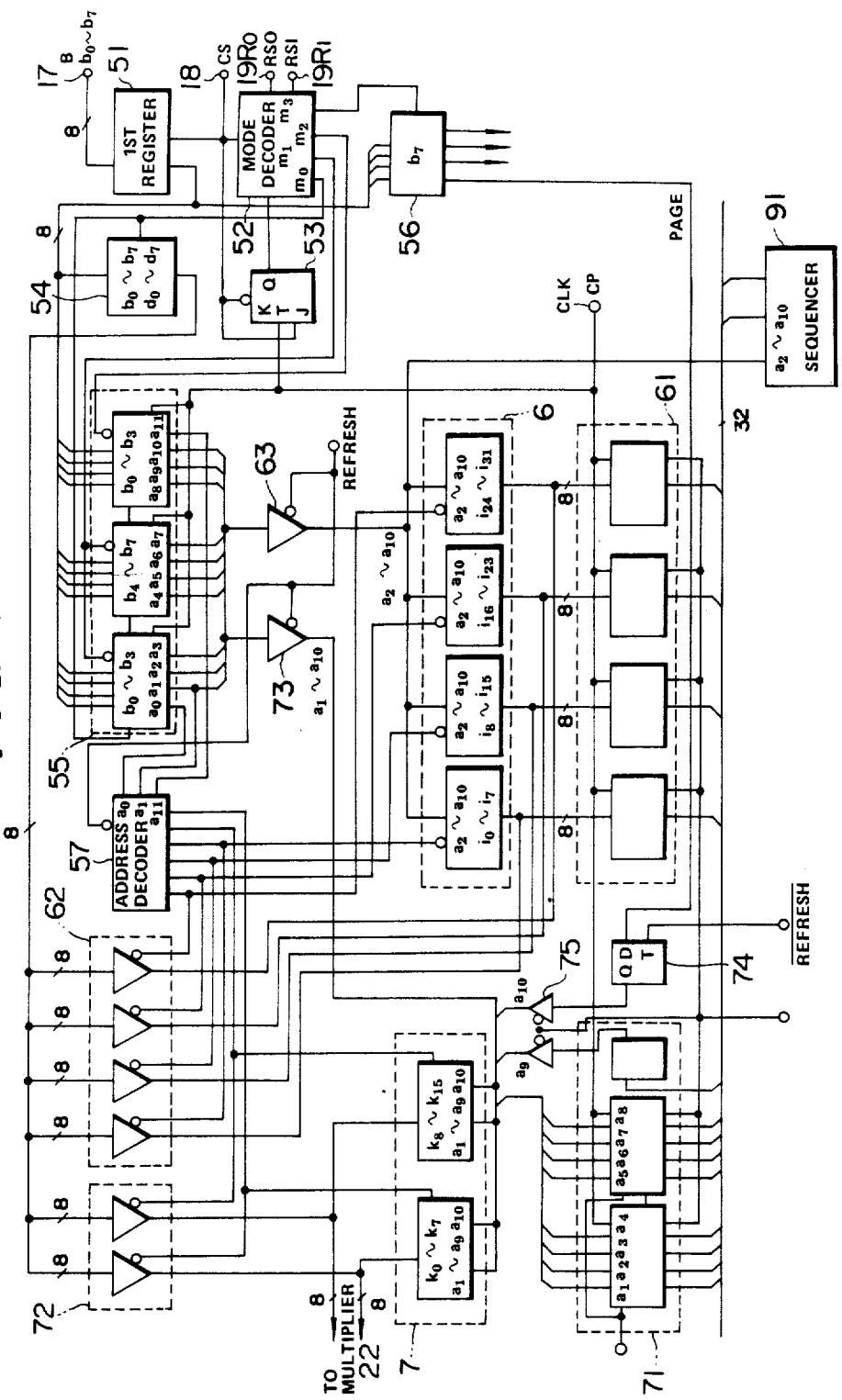
FIG. 5 is a block diagram of an interface circuit, microprogram memory and the coefficient memory with neighboring circuit portions of the DSP.
Figure 6:
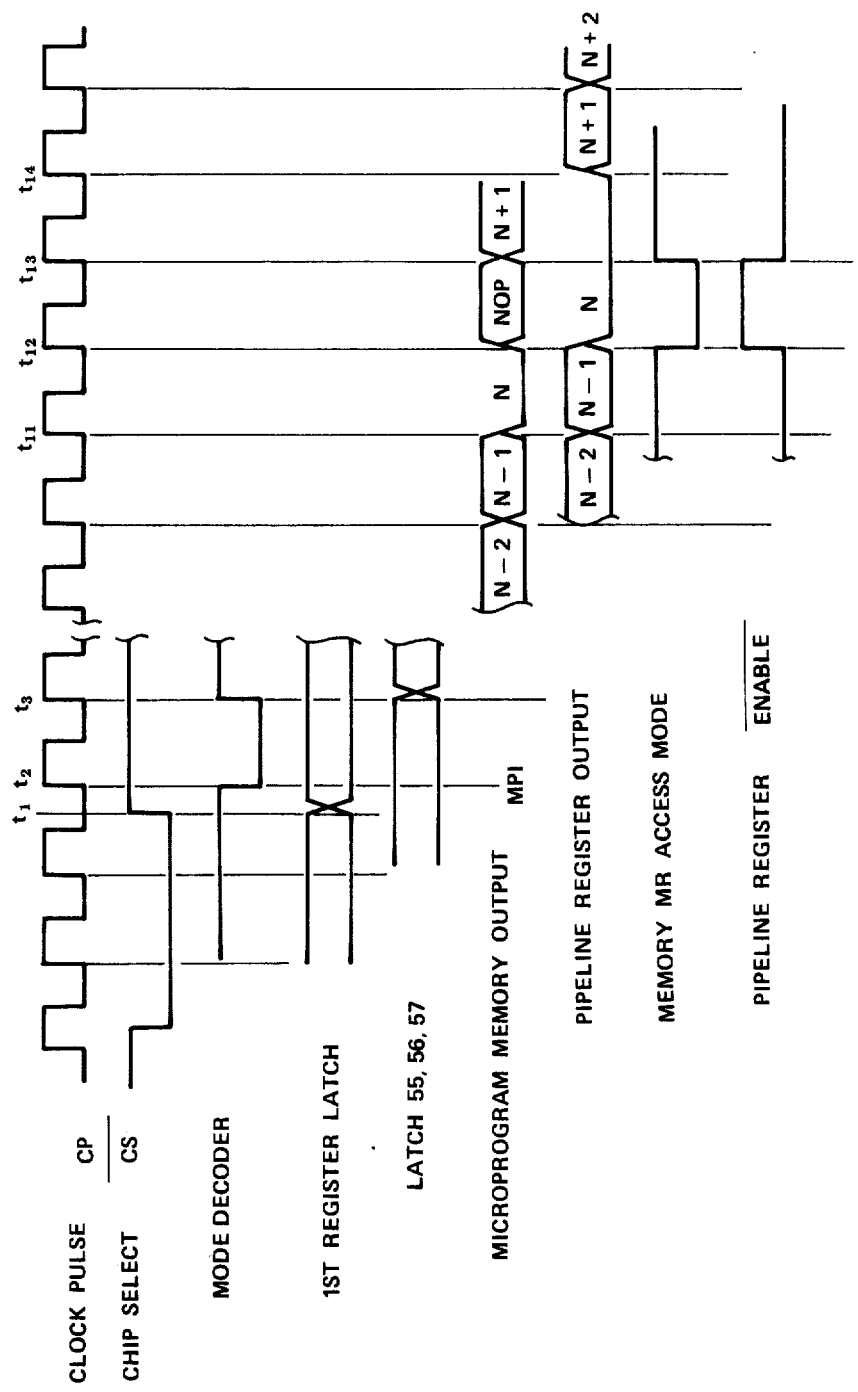
FIG. 6 is a time chart for illustrating the operation of the FIG. 5 circuit.

Reference is had to FIGS. 5 and 6 for illustrating the data write operation into the memory MR from the host computer system 4.

FIG. 5 is a block circuit diagram of the interface circuit 5, program memory 6, coefficient memory 7 and the near-by circuit elements in the DSP 1 shown in FIGS. 1 and 2. The abovementioned 8-bit data B, chip select signal CS and the abovementioned mode switching signals RS 0, RS 1 are respectively supplied to a data input port 17, a chip select input terminal 18 and mode switching signal input terminals 19 $R_0$, 19 $R_1$ shown in FIG. 5. A clock pulse CP as shown in FIG. 6 is supplied to a clock pulse terminal CLK shown in FIG. 5 for synchronizing the operation of the circuit elements included in DSP 1.

It is now supposed that, in order to transfer data from the host computer system 4, the chip select signal $\overline{CS}$ is changed to a low level (L) and again changed to a high level (H) at a time $t_1$. The first register 51 then is enabled at this time $t_1$ to conduct the 8-bit data B from the data input port 17 and transmit the data as output signal. This chip select signal $\overline{CS}$ is changed with a timing irrelevant to the clock pulse CP. The $\overline{Q}$ output of the flipflop 53 is changed from "H" to "L" at a time $t_2$ corresponding to the first build-up of the clock pulse CP since the time $t_1$. This $\overline{Q}$ output is held in the low level "L" until time $t_3$ corresponding to the next buildup of the clock pulse CP, and is transferred to a terminal $\overline{G}_1$ of a mode decoder 52. The mode decoder 52 is responsive to the mode switching signals RS 0, RS 1 at the terminals 19 $R_0$ for activating only one of the signal lines corresponding respectively to the modes $M_0$, $M_1$, $M_2$, $M_3$ and only during the time interval $t_2$–$t_3$. Thus, for data mode $M_0$, an eight-bit data latch circuit 54 is activated to latch the bits $b_0$ through $b_7$ and, for control mode $M_3$, a control data latch circuit 56 is activated to latch only required ones of the bits $b_0$ through $b_7$. An address counter circuit 55 makes use of three 4-bit presettable counters respectively corresponding to address bits $a_0$ through $a_3$, $a_4$ through $a_7$ and $a_8$ through $a_{11}$, respectively. For upper address mode $M_1$, the bits $b_0$ through $b_3$ are latched by one 4-bit presettable counter corresponding to address bits $a_8$ through $a_{11}$. For lower address mode $M_2$, the bits $b_0$ through $b_3$ and $b_4$ through $b_7$ are latched by two 4-bit presettable counters corresponding to address bits $a_0$ through $a_3$ and $a_4$ through $a_7$, respectively. These latching operations are designed to occur at the time $t_3$.

As may be seen from the memory map described by referring to FIG. 3, the eight bits $d_0$ through $d_7$ of the one-byte data D from data latch circuit 54 may be used occasionally as byte $i_0$ through $i_7$, $i_8$ through $i_{15}$, $i_{16}$ through $i_{23}$ or $i_{24}$ through $i_{31}$ included in the microinstruction data I, byte $k_0$ through $k_7$ or byte $k_8$ through $k_{15}$ of the coefficient data K. Which of these bytes correspond to the eight bits $d_0$ through $d_7$ is determined by the address bits $a_0$, $a_1$ and $a_{11}$ of the address A. Thus, whether the data is the microinstruction data or the coefficient data is determined by the address bit $a_{11}$. In case the data is the microinstruction data, the relevant one of the four bytes (32 bits) may be specified by the address bits $a_0$, $a_1$ and, in case the data is the coefficient data, the relevant one of the two bytes (16 bits) may be specified by the address bit $a_0$. Hence the address bits $a_0$, $a_1$, $a_{11}$ are supplied from the address counter 55 to an address decoder 57 from which six outputs corresponding to the bits $i_0$ through $i_7$, $i_8$ through $i_{15}$, $i_{16}$ through $i_{23}$, $i_{24}$ through $i_{31}$, $k_0$ through $k_7$ and $k_8$ through $k_{15}$ are supplied to enable one of six 8-bit buffer gates connected to the output of the data latch circuit 54. Four of these six 8-bit buffer gates are provided in a byte selection circuit 62 for the microinstruction data, and the remaining two gates are provided in a byte selection circuit 72 for the coefficient data.

The microprogram memory 6 and the coefficient data memory 7 are configured with bytes as structural units. Thus the microprogram memory 6 is formed by a parallel connection of four 512-byte memory units and therefore has the capacity of 512 words each consisting of 32 bits. The coefficient memory 7 is formed by parallel connection of two 1024-byte memory units and thus has the capacity of 512 words in 2 pages each consisting of 16 bits. The outputs from the four 8-bit buffer gates of the byte selection circuit 62 are supplied to the four 512-byte memory units of the microprogram memory 6, while the outputs from the two 8-bit buffer gates of the byte selection circuit 72 are supplied to the two 1024-byte units of the coefficient data memory 7. Referring to the 12-bit address output A from the address counter 55, nine bits $a_2$ through $a_{10}$ are supplied to an address bus of the microprogram memory 6 through a nine-bit buffer gate 63, while ten bits $a_1$ through $a_{10}$ are supplied to a coefficient address bus of the coefficient memory 7 through a ten-bit buffer gate 73.

These buffer gates 63, 73 are tristate buffers, i.e. they are enabled by a signal REFRESH switched upon execution of the refresh instructions of the microprogram and otherwise remain in high impedance or floating state. The address decoder 57 also operates responsive to the signal REFRESH for activating one of the six decoder outputs so as to enable only the relevant one of 8-bit buffer gates of the byte selection circuits 62, 72. The buffer gates of these byte selection circuits 62, 72 are also designed as tristate buffers.

The 9-bit program memory address relevant to the address bits $a_2$ through $a_{10}$ are then outputted from the sequencer 91 for sequentially addressing the words in the microprogram memory 6 in order to read out the microinstructions. FIG. 6 shows the microinstructions MPI read out sequentially from the microprogram memory 6. The numbers ---, $N-1$, N, $N+1$, --- are affixed to a series of instructions used for controlling the MCU 2 and the respective circuits included in the DSP 1. It should be noted that the N'th instruction includes a 32-bit refresh instruction in which the refresh command bit is active, and that the instruction immediately following the N'th instruction is disregarded in the DSP 1 because of the resulting refresh operation. Therefore, a no-op instruction (NOP instruction) is inserted between the N'th and (N+1)'th instructions that are intended for actually controlling the signal processing operation.

Referring still to FIG. 6, the N'th instruction including the refresh instruction is read out from the microprogram memory 6 at a time $t_{11}$ determined by the clock pulses CP. This N'th instruction is delayed by one clock pulse interval by being passed through a pipeline register 61, and is executed within the next clock pulse interval $t_{12}$-$t_{13}$. During this time interval $t_{12}$-$t_{13}$, the microprogram memory 6 and the coefficient memory 7 are in the memory access or addressing mode such that access or addressing from the sequencer 91 and the coefficient pointer 71 resulting from the internal operation of the DSP 1 is inhibited and the 8-bit data from the data latch circuit 54 can be written in the 8-bit word addressed by the address A from the address counter 55. In addition, during this time interval $t_{12}$ through $t_{13}$, the status is such that latching by the pipeline register 61 of the 32-bit data read out from the microprogram memory 6 is inhibited, the pipeline register enable signal (Enable signable) being at a high level. Therefore the NOP instruction that is included in the instruction MPI read out from the microprogram memory 6 (that is, the instruction directly following the refresh instruction) is not latched by the pipeline register 61, and the output from the pipeline register 61 is such that the N'th instruction persists during the time interval $t_{12}$-$t_{14}$. In this manner, refresh operation is performed during the time interval $t_{12}$-$t_{13}$, the refresh signal REFRESH being active, so that the buffer gates 63, 73 are enabled and access is had to one word stored in the microprogram memory 6 or the coefficient memory 7. One of the buffer gates in the byte select circuits 62, 72 is enabled for writing a relevant one-byte data from among the 4096 bytes stored in the memory MR.

A coefficient pointer 71 for addressing to the coefficient memory 7 responsive to execution of the microprogram in the DSP 1 is designed for sending a 9-bit address output corresponding to the address bits $a_1$ through $a_9$ to a coefficient address bus in order to address one of two 512-word pages of the coefficient memory 7, and the signal corresponding to the address bit $a_{10}$ specifying the page 0 or page 1 is outputted responsive to the bit $b_7$ in the 8-bit data supplied from the host computer system 4 during the control mode $M_3$. Thus, during the control mode $M_3$, the 8-bit data is latched by the control data latch circuit 56, while the page switching signal PAGE outputted responsive to the bit $b_7$ is supplied to data input terminal D of the D-type flipflop 74. A refresh signal REFRESH inverted during execution of a specified instruction in the microprogram such as refresh instruction is supplied to a trigger input terminal T of the D-type flipflop 74, the data at the data input terminal D being introduced at the refresh timing and outputted from the Q output terminal. This Q output is supplied as address bit $a_{10}$ to the coefficient address bus through buffer gate 75. Therefore, page switching is performed only upon execution of a specified instruction such as refresh instruction contained in the microprogram and in dependence upon the contents of control data originating from the host computer system 4.

In the aforementioned digital signal processing system, the microprogram memory 6 and the coefficient memory 7 appear as a continuous memory MR when viewed from the host computer system 4, as shown in FIG. 3 and may be addressed with a predetermined series of address bits $a_0$ through $a_{11}$. In this manner, data transfer may be performed easily and positively. In addition, the coefficient memory 7 has at least two pages corresponding to the total memory area addressible during execution of the microprogram execution at the DSP 1, and the page switching is controlled by a control data from the host computer system 4 (for example, the contents of the data bit $b_7$ for the aforementioned control mode $M_3$). In this manner, a portion of a series of coefficients need not be rewritten as in the conventional practice so that adverse effects caused by noise or oscillation may be prevented from occurring. Moreover, since the timings for data writing from the host computer system 4 into the memory MR and page switching are provided in a specified cycle that is irrelevant to digital signal processing such as logic operation or multiplication carried out in the course of the microprogram execution, as for example in a refresh cycle accompanying refresh instruction execution, there is no risk that e.g. coefficients be changed in the course of multiplication.

Figure 7:
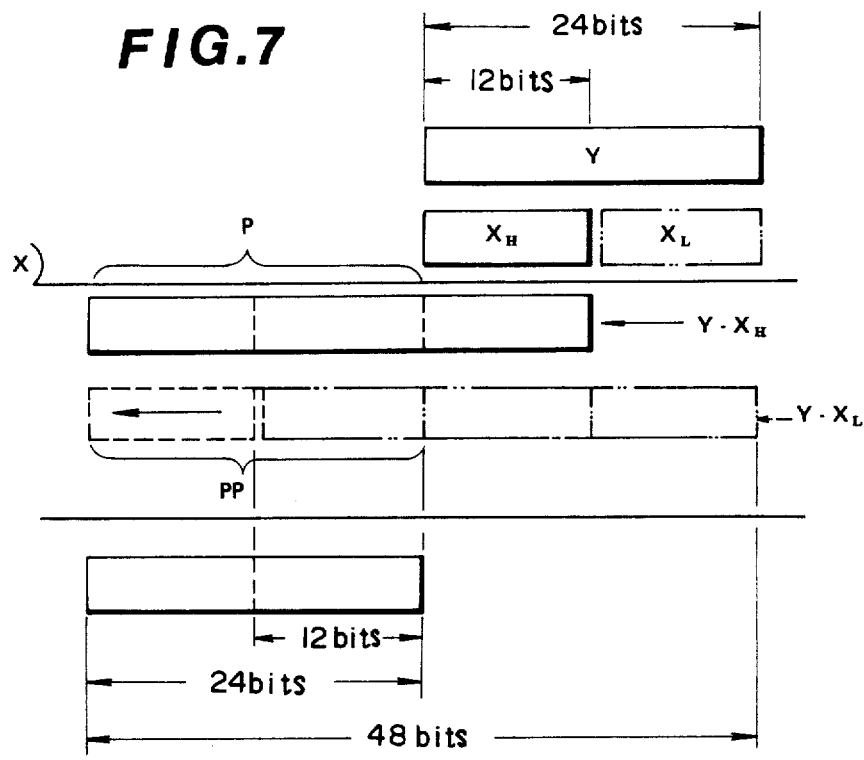
FIG. 7 is a chart illustrating the multiplying operation performed in a multiplier in the DSP.

Reference is now had to FIG. 7 for illustrating multiplication of the double precision coefficient data to be effected at the multiplier 22.

A 12-bit coefficient data X is supplied to a coefficient input terminal X of the multiplier 22, as mentioned above, and is multiplied by a 24-bit digital signal data Y supplied to a multiplicand input terminal Y to give a 36-bit product. The upper 24 bits are taken out as product data P and supplied to multiplexer 23. When the 24-bit double precision is required of the coefficient data, these 24 bits are divided into an upper 12-bit data (one word long data) $X_H$ and a lower 12-bit data (one word long data) $X_L$. These data $X_H$ and $X_L$ are respectively multiplied by the multiplicand data Y and the respective products are added together to give a product for 24-bit coefficient data. In this case, since the upper 12 bits of the 36-bit product data $X_L \cdot Y$, obtained upon multiplication of the lower 12-bit data $X_L$ by the multiplicand data Y, corresponds to the lower 12 bits of the 24-bit product data P, it is necessary to use a second product data PP in which the product $X_L \cdot Y$ is shifted one word or 12 bits towards the lower side and the upper 12 bits are expanded 12 bits towards the upper side to give a 24-bit data.

More in detail, referring to FIG. 7, when the 24-bit digital multiplicand signal Y is multiplied by the 24-bit double precision coefficient data, a coefficient data $X_H$ corresponding to the upper 12 bits of the 24-bit coefficient data is multiplied by the multiplicand data Y in the first stage operation to give a 36-bit product $Y \cdot X_H$, and the upper 24 bits of the product $Y \cdot X_H$ are taken out from multiplier 22 as first product data P. As a second stage operation, the coefficient data $X_L$ corresponding to the lower 12 bits of the aforementioned 24-bit coefficient data is multiplied by the data Y to give a 36-bit product which is then shifted by 12 bits to the lower side so that the product $Y \cdot X_L$ is now placed as a string shown by a double-dotted chain line in FIG. 7. The upper 12 bits of the product are subjected to a sign expansion and the resulting 24 bits are taken out as product data PP from the multiplier 22. By the sign expansion is meant an operation in which the sign bits of the digital data represented in 2's complement format are added in the upper side by a number equal to the total bit number of the new data string less the bit number of the original product.

TABLE 1

| decimal number | Binary number in 2's conplement | | | | | | | | | | | |
|---|---|---|---|---|---|---|---|---|---|---|---|---|
| | 4-bit format | | | | 8-bit format | | | | | | | |
| 7  | 0 | 1 | 1 | 1 | 0 | 0 | 0 | 0 | 0 | 1 | 1 | 1 |
| 6  | 0 | 1 | 1 | 0 | 0 | 0 | 0 | 0 | 0 | 1 | 1 | 0 |
| 5  | 0 | 1 | 0 | 1 | 0 | 0 | 0 | 0 | 0 | 1 | 0 | 1 |
| 4  | 0 | 1 | 0 | 0 | 0 | 0 | 0 | 0 | 0 | 1 | 0 | 0 |
| 3  | 0 | 0 | 1 | 1 | 0 | 0 | 0 | 0 | 0 | 0 | 1 | 1 |
| 2  | 0 | 0 | 1 | 0 | 0 | 0 | 0 | 0 | 0 | 0 | 1 | 0 |
| 1  | 0 | 0 | 0 | 1 | 0 | 0 | 0 | 0 | 0 | 0 | 0 | 1 |
| 0  | 0 | 0 | 0 | 0 | 0 | 0 | 0 | 0 | 0 | 0 | 0 | 0 |
| −1 | 1 | 1 | 1 | 1 | 1 | 1 | 1 | 1 | 1 | 1 | 1 | 1 |
| −2 | 1 | 1 | 1 | 0 | 1 | 1 | 1 | 1 | 1 | 1 | 1 | 0 |
| −3 | 1 | 1 | 0 | 1 | 1 | 1 | 1 | 1 | 1 | 1 | 0 | 1 |
| −4 | 1 | 1 | 0 | 0 | 1 | 1 | 1 | 1 | 1 | 1 | 0 | 0 |
| −5 | 1 | 0 | 1 | 1 | 1 | 1 | 1 | 1 | 1 | 0 | 1 | 1 |
| −6 | 1 | 0 | 1 | 0 | 1 | 1 | 1 | 1 | 1 | 0 | 1 | 0 |
| −7 | 1 | 0 | 0 | 1 | 1 | 1 | 1 | 1 | 1 | 0 | 0 | 1 |
| −8 | 1 | 0 | 0 | 0 | 1 | 1 | 1 | 1 | 1 | 0 | 0 | 0 |

The example, in the above Table 1, e.g. 4 bits equal to the uppermost bit (sign bit) 0 or 1 of the 4-bit binary data in 2's complement representation are added to the upper side to give a 8-bit data which stands for the same number. The hardware design can be so made that the data signal line between the multiplier 22 and the multiplexer 23 is connected as shown in FIG. 2 whereby the first product data P and the second product data PP may be obtained without any changes in the multiplying operation at the multiplier 22. The multiplexer 23 sends the data P to the ALU 21 at the time of first stage multiplication and the data PP to the ALU 21 at the time of second stage multiplication so that the data P and PP are added together in the ALU 21. At least the upper 12 bits of the product may be transferred to the PP input terminal of the multiplexer and the bit shift as well as sign expansion may be performed in the ALU 21.

It may be seen from the foregoing that the multiplier 22 need only have a circuit scale of 24×12 bits for a digital signal data length of 24 bits and a coefficient data word length of 12 bits and that, for an algorithm necessitating double-precision coefficient word length of 24 bits, the double precision coefficient word is divided into upper 12 bits and lower 12 bits that are multiplied respectively by the digital signal data, with the product resulting from the second multiplication being shifted by one word or 12 bits by logic shift or 11 bits by arithmetic shift to the lower side to give a second product data PP which is then added to the product P of the first time multiplication by way of completing the multiplication of 24 bits by 24 bits. The increase in the number of cycles to be executed is approximately only one thus realizing an extremely fast operation compared to the conventional double precision operation.

In addition, single-accuracy fast operation may be selected for operating components requiring only 12 bit coefficient accuracy, and the double-precision may be selected for an operating components requiring higher coefficient precision, such as digital filter. The result is the signal processing system with the improved rate of hardware exploitation.

The present invention is not limited to the above embodiment. For example, the word lengths of the digital signal or coefficient data can be preset in any desired manner. The timing for data writing or page switching operation need not be provided in the refresh cycle, but may also be provided in the cycle of execution of instructions such as no-op or transient stop instructions (pose instruction) that are irrelevant to some degree to the actual processing of the digital signals. Many other changes may be conceived within the scope of the invention.

A digital signal delay circuit which makes use of the digital signal processing system to provide an echo room or machine, and especially the structure of the memory control unit, will now be described by referring to the accompanying drawings.

In the drawings, the numeral 3 designates a signal delay memory, hereafter abbreviated to SDM, having a capacity of e.g. 64K (65,536) 24-bit digital signals. Each word stored in the SDM 3 is addressed by an e.g. 16-bit memory address MA from the address management unit 8 (hereafter abbreviated to AMU) included in the memory control unit 2.

Figure 9:
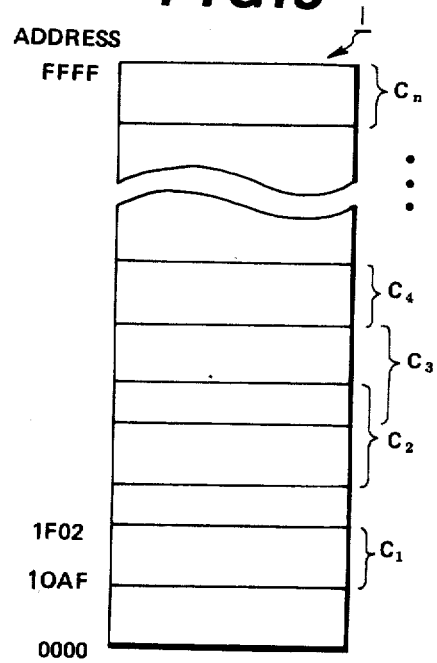
FIG. 9 shows a memory map for the signal delay memory (SDM).

As shown for example in FIG. 9, the 64K words stored in SDM 1 are divided into n memory cells $C_1$ through $C_n$. An address management memory 8' (abbreviated to AMM) is included in the AMU 8 for storage of boundary addresses (top address TA and bottom address BA) of these first to n'th memory cells $C_1$ through $C_n$ and the addresses of the cells being in access operation or current addresses CA. The cells $C_1$ through $C_n$ in the SDM 3 may have overlapping words as do the cells $C_2$ and $C_3$, or may have interrupted address area as do the first cell $C_1$ and the second cell $C_2$. For each of the memory cells $C_1$ through $C_n$, the AMM 81 has an area 81B for storage of a bottom address BA which is the minimum address value, an area 81B for storage of a top address TA which is the maximum address value, and an area 81C for storage of current addresses CA in operation and ranging from the address BA to the address TA. Each area 81B, 81T, 81C may store words in numbers related to the numbers of the cells and may be addressed by the serial cell numbers.

Writing the addresses BA, TA and CA (initialization or subsequent changes) may be performed by the host computer system 4 as in the case of DSP 1. The computer system 4 outputs e.g. 6-bit data for specifying the serial numbers of the memory cells and 16-bit address data for identifying the addresses BA, TA and CA. The serial cell number data and the address data are supplied to AMU 8 through a multiplexer 82 used as switching and selecting means in the MCU 2 and through the address register 11, respectively. It should be noted that, for 6-bit serial cell number data, the SDM 3 can be divided into up to 64 memory cells.

Figure 11:
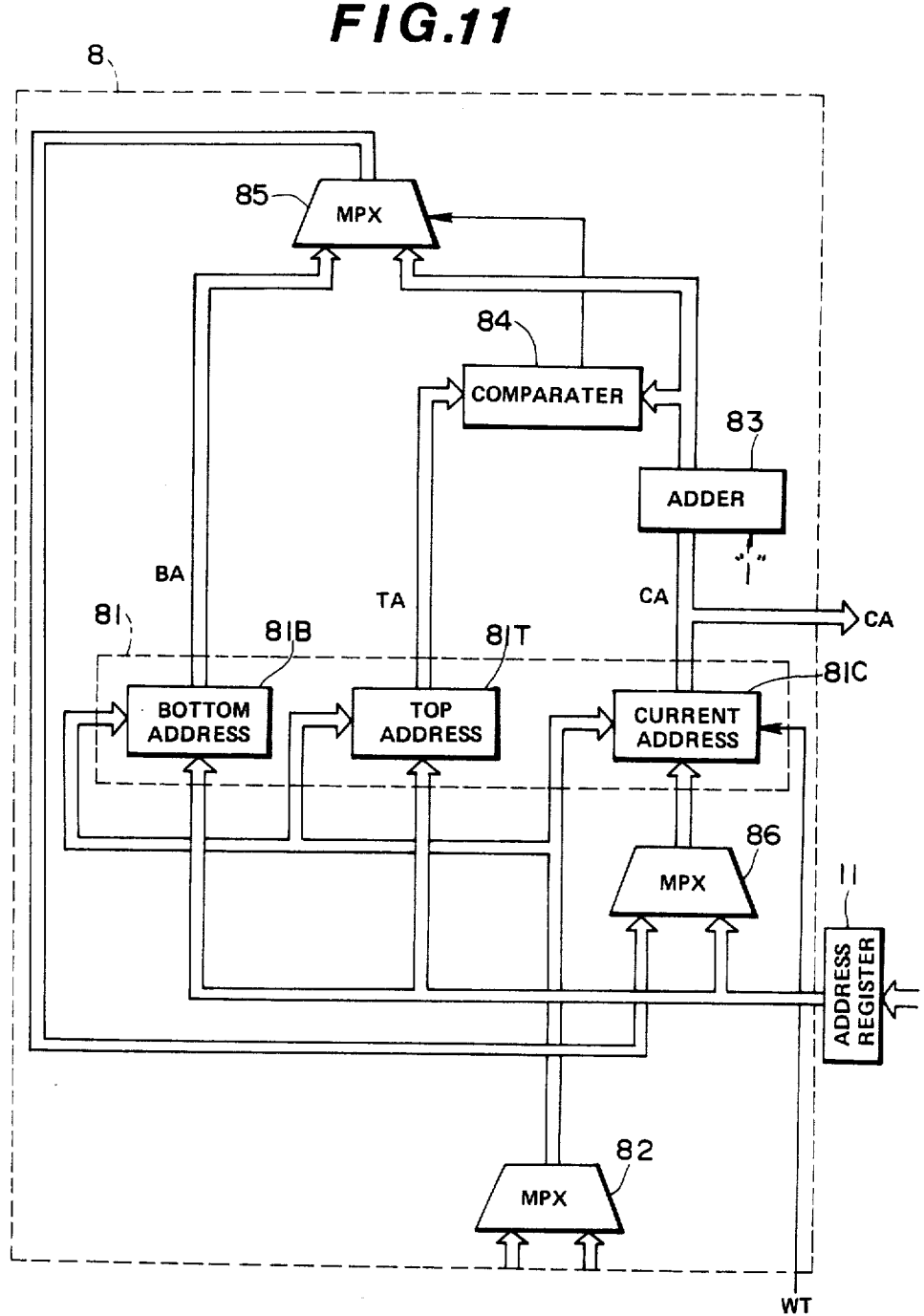
FIG. 11 is a block circuit diagram showing the inside structure of the address management memory shown in FIG. 8.

FIG. 11 shows a typical circuit for AMU 8. In this FIG. 11, an adder 83 is designed to add "1" to (or increment) the current address CA read out from the area 81C of the AMM 81. The result of addition from the adder 83, that is, the incremented current address data, is supplied to a comparator 84 and a multiplexer 85. The result of addition and the top address TA read out from the area 81T of the AMM 81 are compared in the comparator 84 and the result of comparison is supplied to a switching control terminal of the multiplexer 85. The latter is operative to select and output the bottom address BA from the area 81B of the AMM 81 or the result of addition from the adder 83 in view of the abovementioned result of comparison. Thus the bottom address BA is selected and outputted when the result of addition is larger than the top address TA. The output address data from multiplexer 85 is supplied through multiplexer 86 to the area 81C of AMM 81 and written in response to the write instruction WT from the microprogram memory 6. In this manner, the current address CA in the memory area 81C is incremented each time the write instruction WT is outputted to SDM 3 from the microprogram, and the address CA is again incremented from bottom address BA upon reaching the top address.

Figure 8:
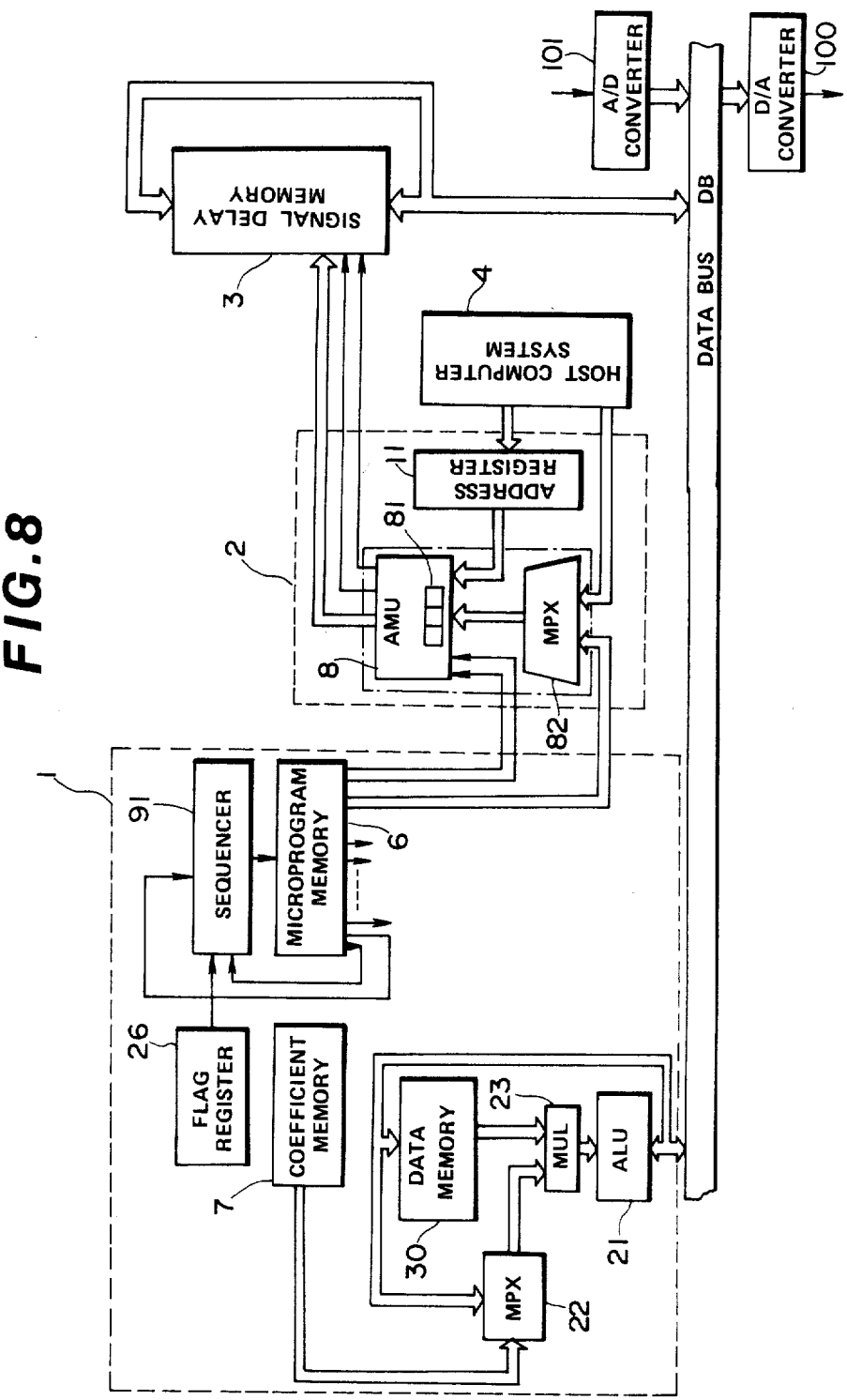
FIG. 8 is a block diagram showing an example of an echo room or machine constructed from a plurality of digital signal delay circuits.

It should be noted that the DPS 1 shown in FIG. 1 corresponds to the circuit portions shown in FIG. 8 excluding MCU 2, SDM 3 and the host computer system.

In the present embodiment, the microinstruction includes a field for controlling the AMU 8 intended for management of the SDM 3. With up to 64 memory cells of the SDM 3, 6 bits are required for specifying the serial cell numbers and 2 bits are also required for controlling the read and write operations of the SDM 3. Hence the field is an 8-bit AMU or SDM control field. This 8-bit AMU control field signal is supplied to AMU 8 where the 16-bit current address CA is produced for addressing to SDM 3 from the current address area 81C of the AMM 81.

When e.g. the first memory cell $C_1$ in SDM 3 is used as delay circuit, it is necessary to write in advance the bottom address $BA_1$ and top address $TA_1$ for the memory cell $C_1$ as well as the current address $CA_1$ ranging from $BA_1$ to $TA_1$, in the respective words stored in areas 81B, 81T and 81C in the AMM 81 and having the addresses for the serial cell numbers equal for example to "1" (initializing step). During such initializing, the multiplexer 82 in the MCU 2 is switched to the host computer system 4 which then transmits a signal specifying the serial cell number "1" and address data for addresses $BA_1$, $TA_1$ and $CA_1$ sequentially to the AMM 8. When transmitting the addresses $BA_1$, $TA_1$ and $CA_1$ sequentially, the computer system 4 also transmits the address identification codes that are used for identifying these addresses. The data thus transmitted are written in the areas 81B, 81T and 81C.

After thus initializing the memory cells to be in use, the multiplexer 82 is switched to the microprogram memory 6 so that the AMU 2 is controlled by the microprogram. In this case, control proceeds to the digital signal delay loop, after all the words in the SDM 3 are cleared or set to "0". In this delay loop, read and write operations are performed for the words in SDM 3 addressed by the current address CA, while the address CA is incremented. In the microprogram, it is only necessary to designate the serial numbers of the memory cells and to issue read and write instructions, and the operation such as incrementing the current address CA as well as switching to the bottom address BA after reaching the top address is performed automatically in the AMU 2.

When the serial cell number in the SDM 3 is specified in the microprogram digital signal delay loop, the current address CA of the word corresponding to the cell number of the AMM 81 is read out and access is made to the SDM 3 by this address CA. When the SDM 3 has an access time of the order of or less than one microprogram instruction cycle, the contents data of the addressed word can be inputted or outputted by the following microinstruction whereby digital signals can be read out from or written in SDM 3. In the read mode, the current address CA is not updated in the AMU 2 and the data read out from SDM 3 in the instruction cycle subsequent to designation of the serial cell number may be transmitted through data bus DB to the registers or to circuit elements performing the next processing steps such as multiplier and D/A converter. In the write mode, a write pulse is outputted responsive to the microinstruction subsequent to the memory access whereby the digital data on the data bus DB is written into the addressed word stored in SDM 3, while the current address CA is updated in AMU 8, that is, the address data from the multiplexer 85 is taken into AMU 8.

Figure 12:
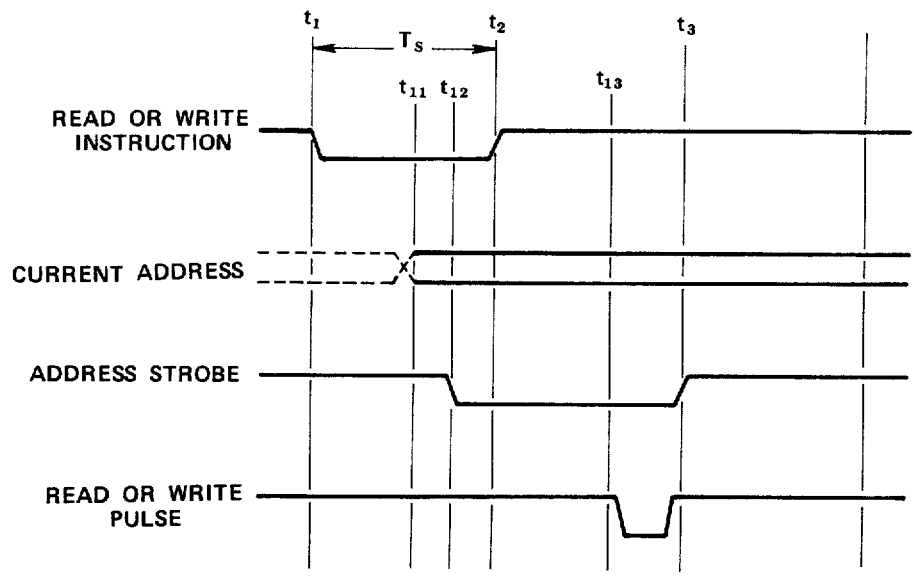
FIG. 12 is a time chart illustrating the timing of various signals that are generated at the time of execution of the microprogram read-out and write instructions.

Reference is had to FIG. 12 for illustrating the operational timing in the write mode. In FIG. 12, the time interval $T_s$ corresponds to one instruction cycle in the microprogram. The serial cell number is designated in relation to the write instruction during the time $t_1-t_2$, and data is exchanged between SDM 3 and data bus DB during the time $t_2-t_3$. When the serial cell number is specified at time $t_1$, the current address CA read out from the current address area 81C of the AMM 81 is determined at time $t_1$ after lapse of a predetermined access time. Since time $t_{12}$ or right after the time $t_{11}$, an address strobe pulse for SDM 3 is produced to permit access to SDM 3. Reading from and writing into SDM 3 is enabled after lapse of an addressing time which is determined by the characteristics of the memory device being employed and is of the order of one hundred and several scores of nanoseconds with a dynamic RAM. Write and read pulses are outputted at time $t_{12}$ directly before lapse of the time $t_2-t_3$ for the next instruction cycle or directly before time $t_3$ for exchange of digital signal data between the addressed word and the data bus DB. During the time interval from time $t_{11}$ the current address CA is determined until time $t_{13}$ the above write pulse is issued from the SDM 3, incrementing the address CA by the adder 83, comparison thereof with top address TA by the comparator 84 and selection by the multiplexer 85 are performed in AMU 3. The address from multiplexer 85, that is, the next address NA necessary for having access to the SDM 3 in the next signal delay loop, is sent through multiplexer 86 to the current address area 81C. The next address NA is written into the current address area 81C only at the time $t_{13}$ the write pulse is outputted in the write mode. Hence, in one cycle of the microprogram signal delay loop, the digital signal is written into the same word in the SDM 3 to which access has been made during reading with the current address CA, and the current address CA in the current address area 81C of the AMM 81 is written into the next address only at this time. It is after the total words in the memory cell used as delay line (such as first memory cell $C_1$) have been addressed that the word into which the digital signal has been written is read out a second time, the delay time being a product of the total number of words included in the memory cell or the difference between the top address TA and the bottom address BA and the cycle time for the microprogram signal delay loop. The cycle time of the loop may be equated to the sampling period when a program is inserted into the signal delay loop for repeatedly checking for termination of the sampling operation at the A/D converter until termination of the sampling.

For sampling clock frequency of 50 kHz (sampling period of 20 μsec) and the number of the words in the memory cell used as delay line equal to 1,000 words, the delay time is 20 milliseconds. For increase of one word in the memory cell, the delay time is increased 20 μseconds and, for decrease of one word in the memory cell, the delay time is decreased 20 μseconds. The word number can be easily increased and decreased by rewriting at least one of the bottom address BA and the top address TA of the memory cell through control operation from the host computer.

Figure 13:
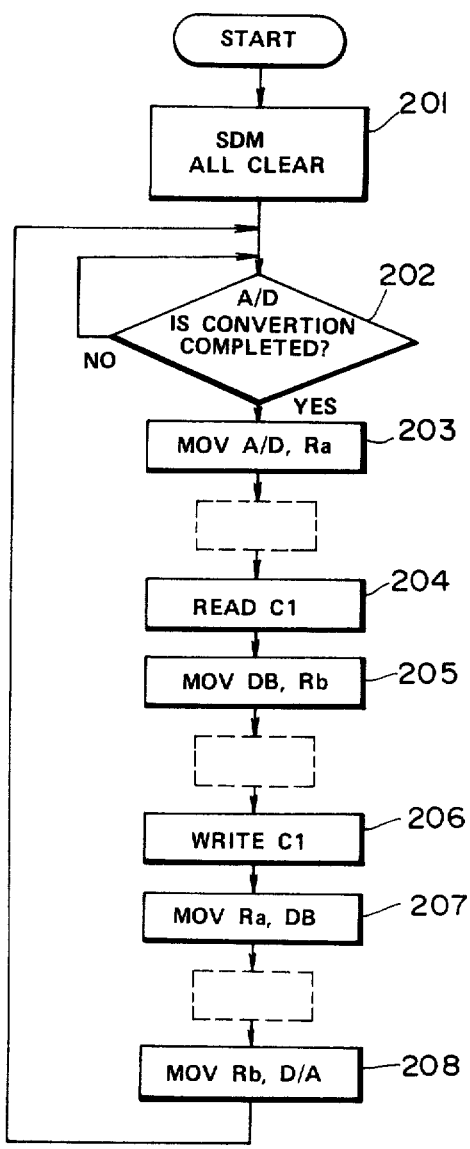
FIG. 13 is a flow chart showing a typical program for introducing the signal delay through software operation.

FIG. 13 shows a typical flow chart for realizing such signal delay procedure by a microprogram. Before proceeding to the signal delay loop, "0" is written into all of the words in the SDM 3 by step 201 (all clear or initial resetting). This step is followed by the signal delay loop beginning from a step 202 which makes a check that the A/D conversion is completed. Each time the sampling operation is performed in the A/D converter 100, the digital signals are read from or written into SDM 3 while the current address CA in the current address area 81C of the AMM 81 is automatically rewritten in the AMU 8 (step 203 et seq). In a step 203, the digital signal data passed through the A/D conversion is stored through data bus DB into e.g. the register area Ra of the data memory 30. In steps 204 and 205, serial memory cell numbers are allotted to the SDM 3 for reading out the digital signal data. Thus, in step 204, the instruction to read the first memory cell $C_1$ is issued to AMU 8 which then outputs a current address CA corresponding to the first memory cell, said address CA being used for having access to SDM 3. Output data may be valid and read out from SDM 3 after access time determined by the characteristics of memory elements used in SDM 3. The output data may become valid in general in one hundred and several scores of nanoseconds in case of using a dynamic RAM as SDM 1. In step 205, with the output data fixed in this manner, the data supplied from SDM 3 to data bus DB is stored e.g. in the register area Rb of the data memory unit. Therefore, reading from SDM 3 is realized in two microinstruction steps. However, the reading from SDM 3 may also be realized by one microinstruction step when the time for executing one microinstruction step (instruction cycle) is long or the access time to AMM 81 or SDM 3 may be minimized.

In a step 206, which is the write instruction for the first cell in SDM 3, write instruction and serial cell number designation are issued to AMU 8, whereby the current address CA corresponding to the first cell is read out for addressing to SDM 3. The write signal for SDM 3 is outputted in the next step 207. At this time, the contents of the register area Ra storing the data from the A/D converter 100 are supplied to the data bus DB and written into SDM 3.

The data read out from memory cell $C_1$ of the SDM 3 and stored in the register area Rb is supplied to D/A converter 101 in step 208. Then, the control returns to step 202 to complete the basic signal delay loop.

The aforementioned echo room or machine can be constructed from several signal delay lines without changes in hardware design by introducing in the step 209 (or in the position shown by dotted line in FIG. 12) a program in which other memory areas are designated for read/write operations or a program in which data read out from respective cells of SDM 3 are multiplied by a coefficient and the resulting product is added to the pre-delay data (such as data passed through A/D conversion and stored in the register area Ra). In addition, the serial memory cell number may be designated by the host computer system 4 during, for instance, the waiting time for A/D conversion in step 201 for rewriting the aforementioned bottom address BA or top address TA for dynamically changing the delay time of the signal delay circuits corresponding to the respective cells.

Figure 14:
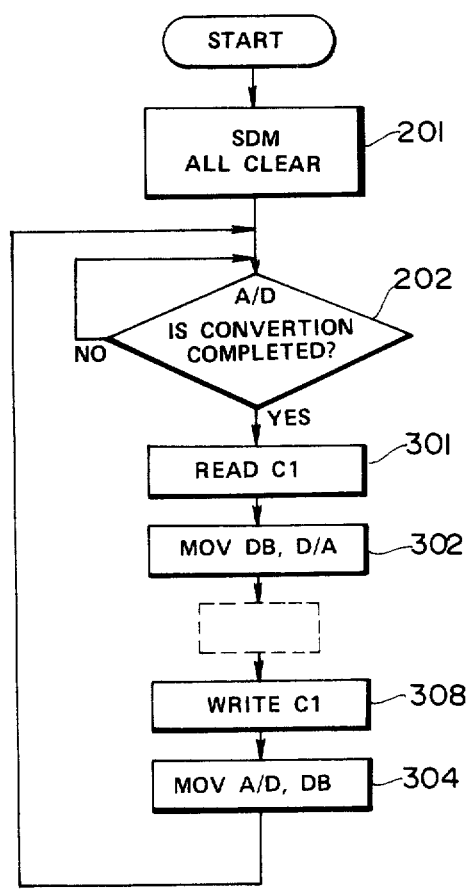
FIG. 14 is a flow chart showing a modification of the program shown in FIG. 13.

The data from the A/D converter 101 can be written directly in SDM 3 or the data read out from SDM 3 can be forwarded directly to a D/A converter 100 without making use of register areas Ra, Rb of the data memory unit 30. FIG. 14 shows a flow chart for this procedure. In FIG. 14, the steps 201, 202 are the same as in FIG. 13. However, a step 301 for reading e.g. the first memory cell $C_1$ of SDM 3 (corresponding to step 204 in FIG. 13) is placed next to step 202. When the data thus read out is valid in the data bus DB, it is directly forwarded to the D/A converter 100 in step 302. In step 303, which is equivalent to step 206 in FIG. 13, access is made to the write address in the first memory cell $C_1$ of SDM 3. In step 304, the data from A/D converter 101 is written through data bus DB into the address to which access has been made in the preceding step. The steps comprized of the step 202 for judging the condition through to the step 304 make up a complete cycle of the delay loop. It should be noted that the condition step 202 may be placed between steps 302 and 303. In this case, the steps 301, 302, 202, 303 and 304 make up one complete cycle of the delay loop.

Figure 15:
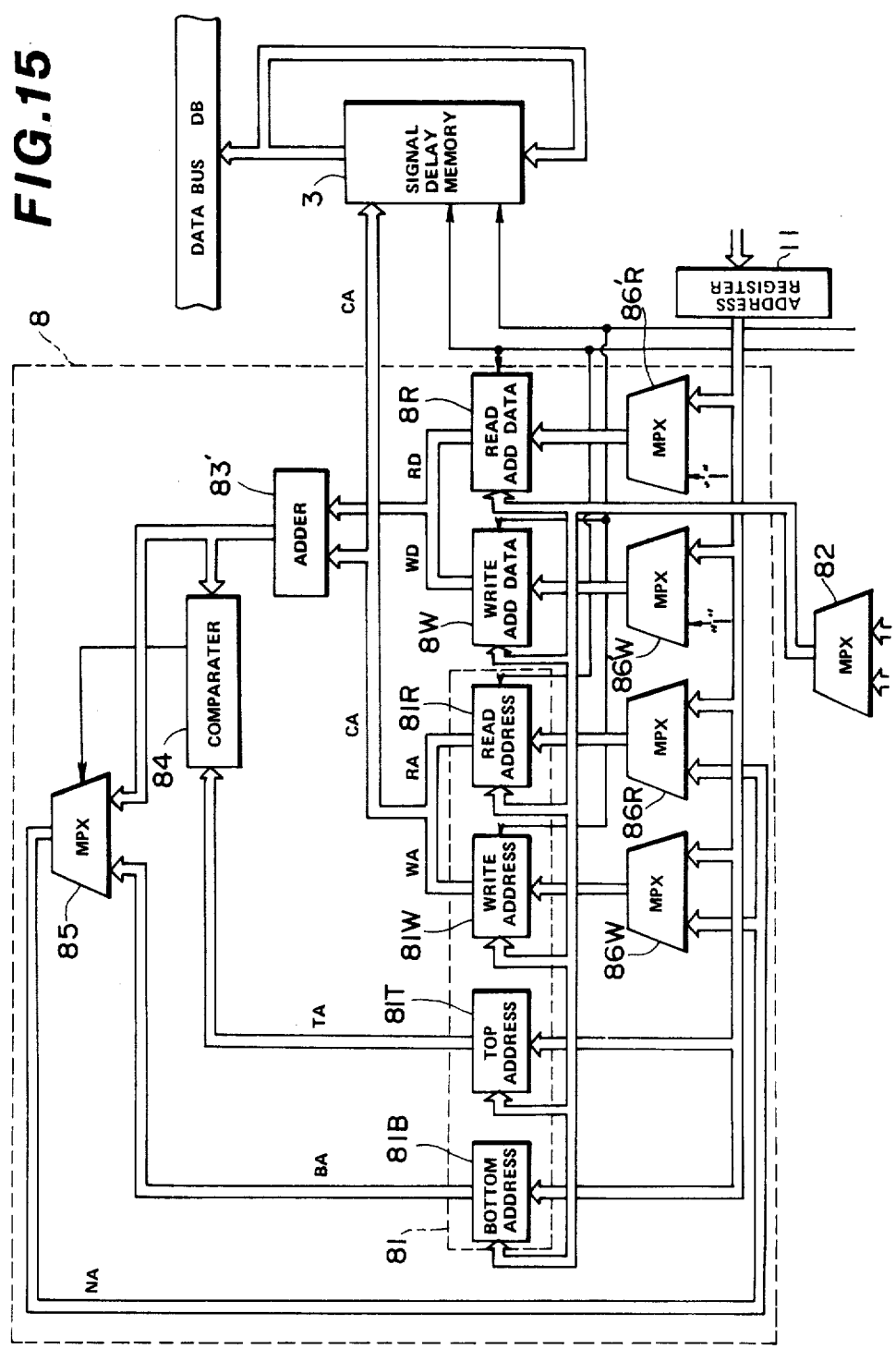
FIG. 15 is a block diagram showing essential portions of a modified echo room or machine.

A modified embodiment of the digital signal processor of the present invention, when applied to an echo room or machine, is described by referring to FIG. 15.

Figure 10:
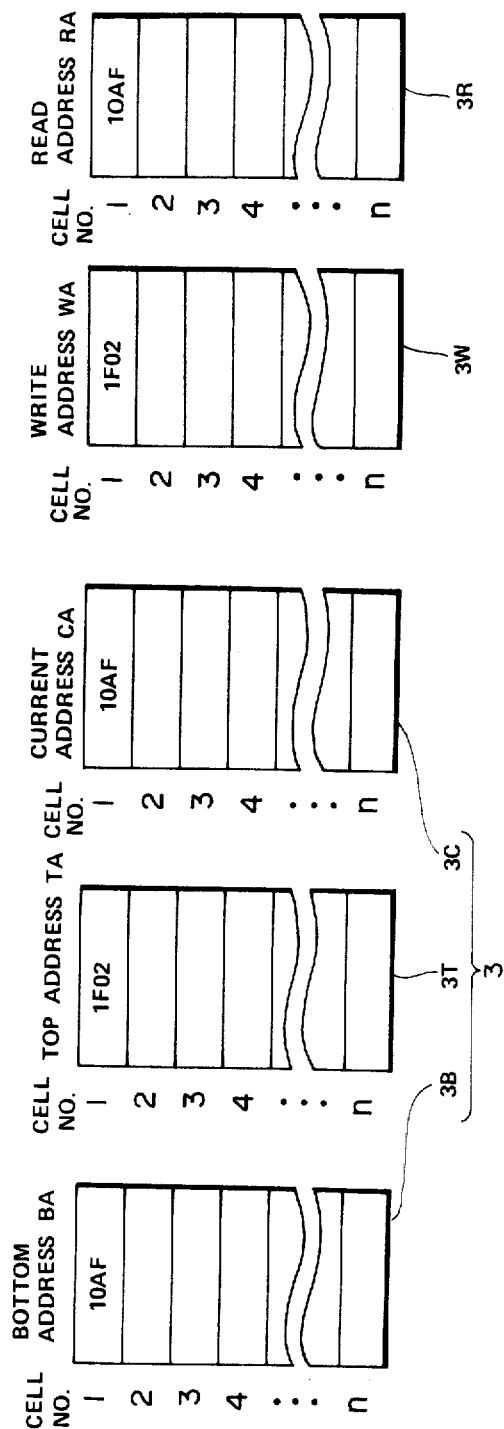
FIG. 10 is a chart illustrating the structure of an address management memory.

In the present embodiment, write address WA and read address RA shown in FIG. 10 are used instead of current address CA. These addresses are stored in areas 81W, 81R in AMM 81, respectively.

In the AMU 8, there are provided a WD memory circuit 8W for storage of write data WD to be supplied to the write address WA, an RD memory circuit 8R for storage of read data D to be supplied to the read address RA, and an adder 83' for adding the write address WA from area 81W of AMM 81 and the write data WD from the memory circuit 8W to one another during writing and adding the read address RA from area 81R of AMM 81 and the read data RD from the memory circuit 8R to one another during reading. The sum from the adder 83' is supplied to a comparator 84 and to a multiplexer 85 used as switching and selecting means. The sum and the top address TA from area 81T are compared to one another in the comparator 84 and the result of such comparison is sent to a switching control terminal of the multiplexer 85. The multiplexer 85, the latter selects and outputs the bottom address BA from the area 81B of AMM 81 or the sum from the adder 83' depending on the result of comparison. Thus it selects and outputs the bottom address BA when the sum is larger than the top address TA and the sum if otherwise. The output data from multiplexer 85 is the next address NA specifying the write or read address to which access is to be had next time. This output data is sent to the area 81W of AMM 81 through multiplexer 86W during writing and to the area 81R of AMM 81 through multiplexer 86R during reading. Write data "1" or write data from the host computer system 4 such as "0" or "2" have been supplied by this time to the memory circuit 8W for the write data WD to the write address WA, after switching and selection by the multiplexer 86'W, whereas read data "1" or read data from the host computer system 4 have been supplied similarly to the memory circuit 8R for the read data to the read address RA after switching and selection by the multiplexer 86'R. When the delay time is constant, the write data "1" and read data "1" are supplied from the multiplexers 86'W, 86'R to the memory circuits 8W, 8R so that the write and read data WD, RD from these memory circuits 8W, 8R are "1". Therefore, in the adder 83', the write address WA is increased by one or incremented for each writing operation, and the read address RA is also increased by one for each reading operation.

Reference is again had to FIG. 12 for illustrating the timing relation of the reading and writing of the digital signals relative to SPM 3. During reading operation, the serial cell number is specified at time $t_1$ and the read instruction is given to AMU 8. The word in the read address area 81R of the AMM 81 corresponding to the specified serial cell number is addressed and the output data (read address RA) is valid at time $t_{11}$ after lapse of a predetermined access time. An address strobe signal is outputted since time $t_{12}$ after the time $t_{11}$ so that the SDM 3 is addressed with the read address RA.

In the instruction cycle for time $t_2$-$t_3$ in FIG. 12, a read pulse is outputted at time $t_{13}$ when the access time has elapsed and the output data has become valid, thereby opening an output gate of the SDM 3 and supplying the contents of the addressed word on the data bus DB for further processing in registers or other relevant circuits such as multiplier, adder or D/A converter.

During such reading operation, the read address RA is updated automatically in the AMU 8. When fixed at time $t_{11}$, the read address RA from area 81R is sent to the adder 83' where it is added to the read data from the memory circuit 8R. For a constant delay time, the read data is "1" and the read address RA is incremented and supplied to the comparator 84 and multiplexer 85. When the read address thus incremented is less than the top address TA, it is selected at the multiplexer 85 as next address NA and forwarded through multiplexer 86R to the area 81R of AMM 81. The above operation takes place automatically until time $t_{13}$. The next address data is then taken into area 81R responsive to the read pulse produced at time $t_{13}$ for rewriting or updating the read address RA. When the incremented address from the adder 83' is larger than the top address TA, the bottom address BA is selected by multiplexer 85 as next address NA.

The operation during the writing phase of the microprogram would be the same as the read operation described above if the read address RA, area 81R, memory circuit 8R, read data RD and the multiplexer 86R referred to in the description of the read operation were replaced by the address WA, area 3W, memory circuit 8W, write data WD and the multiplexer 86W, respectively. Thus, responsive to the write pulse at time $t_{13}$, the write address WA is updated, while the digital signal data from the registers and data output circuits etc. are written into SDM 3 through data bus DB.

Figure 16:
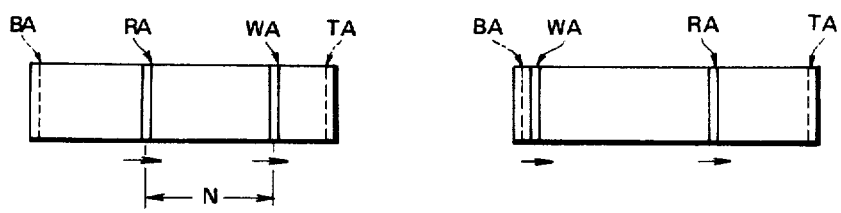
FIG. 16 is a chart illustrating the movement of the incremented read-out and write addresses on the memory.

FIG. 16 illustrates the movement of the read address RA and write address WA on the memory cell of the SDM 3 used as delay circuit. Supposing that the read address RA and write address WA shown in FIG. 16A are moved for each increment in the direction of the arrow mark or from bottom address BA towards top address TA, the product of the sampling period with the number of words N equal to the difference between the addresses RA, WA (N=WA−RA) represents the delay time. FIG. 16B shows the state of the memory cell in which the write address WA has once reached the top address where it is switched to the bottom address BA from which it is incremented again. The delay time is not changed since the sum of the number of words from the read address RA to the top address TA and the number of words from bottom address BA to the write address WA is equal to the word number difference N.

In the foregoing description, it has been assumed that the delay time is constant and is not changed. Description is now made of how the delay time can be changed during microprogram execution.

When it is desired to prolong the delay time, write data "0" is written into memory circuit 8R from the host computer system 4 through multiplexer 86'R at a time in the course of the signal delay loop well before addressing to SDM 3, for example, during waiting time for A/D conversion (step 202 in FIG. 13). In this case, since "0" is added to the read address RA during the reading phase in the same cycle of the program loop (steps 204, 205), the read address is not incremented, and is inhibited from moving in the arrow mark direction in FIG. 16. On the other hand, the write address WA is incremented during the writing phase in the same cycle of the program loop, resulting in the incremented word number difference and the delay time prolonged by one sampling period. From the next cycle on, both the read address RA and the write address WA are incremented so that the word number difference equal to (N+1) is maintained. When it is desired to prolong the delay by n sampling periods, the aforementioned operation of writing "0" into the memory circuit 8R is repeated n times at intervals of the aforementioned sampling period (one cycle time of the program loop). The delay time can also be prolonged by writing "2" or higher values as write data into the memory circuit 8W. However, this is not preferred because the write address WA of SDM 3 is increased by two or more at a time, resulting in the contents of intermediate words remaining unchanged and completely discrete read-out data.

When it is desired to shorten the delay time, write data "0" is written into memory circuit 8W from the host computer system 4 through multiplexer 86'W for reducing the delay time by one sampling period. This operation can naturally be repeated n times for shortening the delay time by n sampling periods.

In this manner, it is possible to change the initially set delay time by time intervals equal to a whole number multiple of the sampling interval by writing "0" into the memory circuits 8R or 8W a desired number of times. In the above procedure, the read address RA or the write address WA is inhibited only temporarily from being incremented so that temporal continuity of the readout data may be maintained and noises may be prevented from occurring.

It may be seen from the foregoing that plural digital signal delay lines can be realized with the use of a single SDM 3 and hence the hardware design may be simplified because the separate hardware devices for the respective delay lines as required when using shift registers may be dispensed with. In addition, actual address management for SDM 3 is taken charge of in the AMU 8 and the read and write addresses (current address) can be incremented or otherwise processed in this AMU so that the ALU 21 for example may take over and execute other jobs and the throughput of the digital signal processing unit as a whole may be improved. The delay time for the signal delay line for each memory cell can be changed easily by software control through the host computer system 4, while the delay time can also be changed dynamically in the course of the realtime signal processing.

What is claimed is:

1. A digital signal processing system comprising
microprogram memory means for storing a plurality of microinstructions for instructing a digital signal processing procedure,
coefficient memory means for storing coefficient data required for performing a series of arithmetic operations on digital signal data,
a host computer system,
means for writing data into said microprogram memory means and said coefficient memory means from said host computer system,
said coefficient memory means having at least two selectable pages corresponding to a total memory area accessible during digital signal processing in accordance with said microinstructions, and
said host computer system controlling page selection of said pages of said coefficient memory means.

2. The digital signal processing system according to claim 1 further including
means for reading said microinstructions sequentially from said microprogram memory means,
said coefficient data being double precision data, with upper and lower single word halves,
means for reading said double precision coefficient data from said coefficient memory means,
multiplier means for multiplying said digital signal data by said double precision coefficient data read from said coefficient memory means,
said multiplier means including means for producing a first double precision product output representing a product of said upper half of said double precision coefficient data and said digital signal data and for producing a second double precision output representing a second product of said lower half of said double precision coefficient data and said digital signal data,
means for shifting said second output by bits equivalent to one word, and
means for summing said first output and said shifted second output to effect multiplication of said digital signal data by said double precision coefficient data.

3. A digital signal processing system comprising
a digital signal processing unit including microprogram memory means for storing a plurality of microinstructions for instructing a digital signal processing procedure, and coefficient memory means for storing coefficient data required for performing a series of arithmetic operations on digital signal data,
memory control means,
at least one memory block for storing said digital signal data,
a host computer system,
means for writing data into said microprogram memory means and said coefficient memory means from said host computer system,
said coefficient memory means having at least two selectable pages corresponding to a total memory area accessible during digital signal processing in accordance with said microinstructions, said host computer system controlling page selection of said pages of said coefficient memory means, said memory control means including address management memory means for dividing said at least one memory block into a plurality of memory cells identified by respective boundary addresses, means for writing said boundary addresses of said memory cells from said host computer system into said address management memory means, said memory cells being accessible in accordance with serial memory cell numbers designated from said digital signal processing unit.

* * * * *